Dec. 13, 1960

B. E. BECKNER ET AL 2,964,594

APPARATUS FOR MAGNETICALLY RECORDING HIGH-FREQUENCY SIGNALS BY MEANS OF A ROTATING TRANSDUCER MEANS

Filed Sept. 4, 1957

3 Sheets-Sheet 1

Jack H. Irving
Bernard E. Beckner,
Deceased
By Security First National Bank of Los Angeles, Executor
BY Albert Rosen
Morris Spector
ATTORNEYS Dec. 13, 1960 B. E. BECKNER ET AL 2,964,594

APPARATUS FOR MAGNETICALLY RECORDING HIGH-FREQUENCY SIGNALS BY MEANS OF A ROTATING TRANSDUCER MEANS

Filed Sept. 4, 1957 3 Sheets-Sheet 2

INVENTORS
Jack H. Irving
Bernard E. Beckner, Deceased
By Security First National Bank of Los Angeles, Executor
Albert Rosen
BY
Morris Spector
ATTORNEYS Dec. 13, 1960 B. E. BECKNER ET AL 2,964,594

APPARATUS FOR MAGNETICALLY RECORDING HIGH-FREQUENCY SIGNALS BY MEANS OF A ROTATING TRANSDUCER MEANS

Filed Sept. 4, 1957 3 Sheets-Sheet 3

Jack H. Irving
Bernard E. Beckner, Deceased
By Security First National Bank of Los Angeles, Executor
BY Albert Rosen
Morris Spector
ATTORNEYS United States Patent Office 2,964,594

Patented Dec. 13, 1960

2,964,594

APPARATUS FOR MAGNETICALLY RECORDING HIGH-FREQUENCY SIGNALS BY MEANS OF A ROTATING TRANSDUCER MEANS

Bernard E. Beckner, deceased, late of El Segundo, Calif., by Security First National Bank of Los Angeles, California, Westwood Village Branch, executor, and Jack H. Irving, Los Angeles, Calif., assignors, by mesne assignments, to Thompson Ramo Wooldridge Inc., Cleveland, Ohio, a corporation of Ohio Filed Sept. 4, 1957, Ser. No. 682,048

2 Claims. (Cl. 179—100.2)

This invention relates to magnetic recording and playback methods and systems. In particular, the invention concerns systems employing transducing heads, such as magnetic recording or playback heads, in which a head moves with respect to magnetic tape at a speed which is different from the speed of passage of the tape across its support.

It is often desirable to record and play back very high frequency signals, for example, video frequency signals. The usual approaches to this problem have not proven entirely satisfactory. For example, high magnetic tape speeds or frequency multiplexing techniques have been used. However, high magnetic tape speeds are subject to mechanical and tape storage limitations and frequency multiplexing techniques require costly and elaborate electronic equipment.

There are applications where it is desirable to repeatedly scan a section of magnetic tape. For example, this is often desirable in data analysis, and in studying low repetition rate phenomena (e.g., a radar picture) or random transient phenomena (e.g., noise analysis or rupture analysis in mechanical testing). The previous methods of accomplishing this have required cutting out the section of the tape to be analyzed and making the section into an endless loop so that it may be repeatedly scanned. This makes it difficult to continuously analyze successive sections of tape.

Accordingly, one object of the invention is the provision of an improved method and means for recording and playing back high freqeuncy signals (e.g., several megacycles per second) at low magnetic tape speeds.

Another object is to provide an improved method and means for magnetically recording and reproducing high frequency signals at low magnetic tape speeds with a constant relative velocity between the tape and its associated transducing device.

A further object of the invention is to provide improved recording and playback apparatus capable of providing a high signal strength output of low signal level, high frequency signals.

Still another object of the invention is to provide improved means for continually presenting a portion of a signal recorded on magnetic tape.

A still further object is to provide improved apparatus for repeatedly scanning a transient or low repetition rate signal recorded on a portion of a long length of magnetic tape without resort to cutting out that portion of tape and forming it into an endless loop.

The foregoing and related objects are realized in accordance with the invention by the provision of an improved magnetic transducing method and system that makes use of a magnetic transducing head that rotates at a high velocity relative to a stationary or slowly moving magnetic tape.

In one embodiment a transducing head is mounted for continuous, high velocity rotation in a circular path about magnetic tape. The tape is supported in an arcuate path around the periphery of a support disk and adjacent to the path of travel of the head for scansion by the head. The tape is continuously fed to the periphery of the support disk from a position outside of the plane of rotation of the head so that the tape may be continuously fed to scanning position around the disk without interfering with the rotation of the head. If the tape is slowly advanced in the arcuate path during the scansions, successive portions of the tape are scanned at high velocity while the tape itself is moved at low velocity. If the tape is maintained stationary during the rotation of the head, one tape portion is subjected to repeated scansions. Consequently, the relative velocity between the head and tape may be made as high as several thousand inches per second—this permits recording or playback of very high frequency signals.

In another embodiment a number of transducing heads are used, the heads being positioned to scan adjacent signal recording channels on the tape. The heads are spaced along the path of travel so that as one head loses contact with the tape the next has already made contact. By this means continuously received video signals or other high frequency information can be stored and played back at relatively low tape speeds.

In the drawings, wherein like reference characters refer to like parts:

Figures 1, 3:
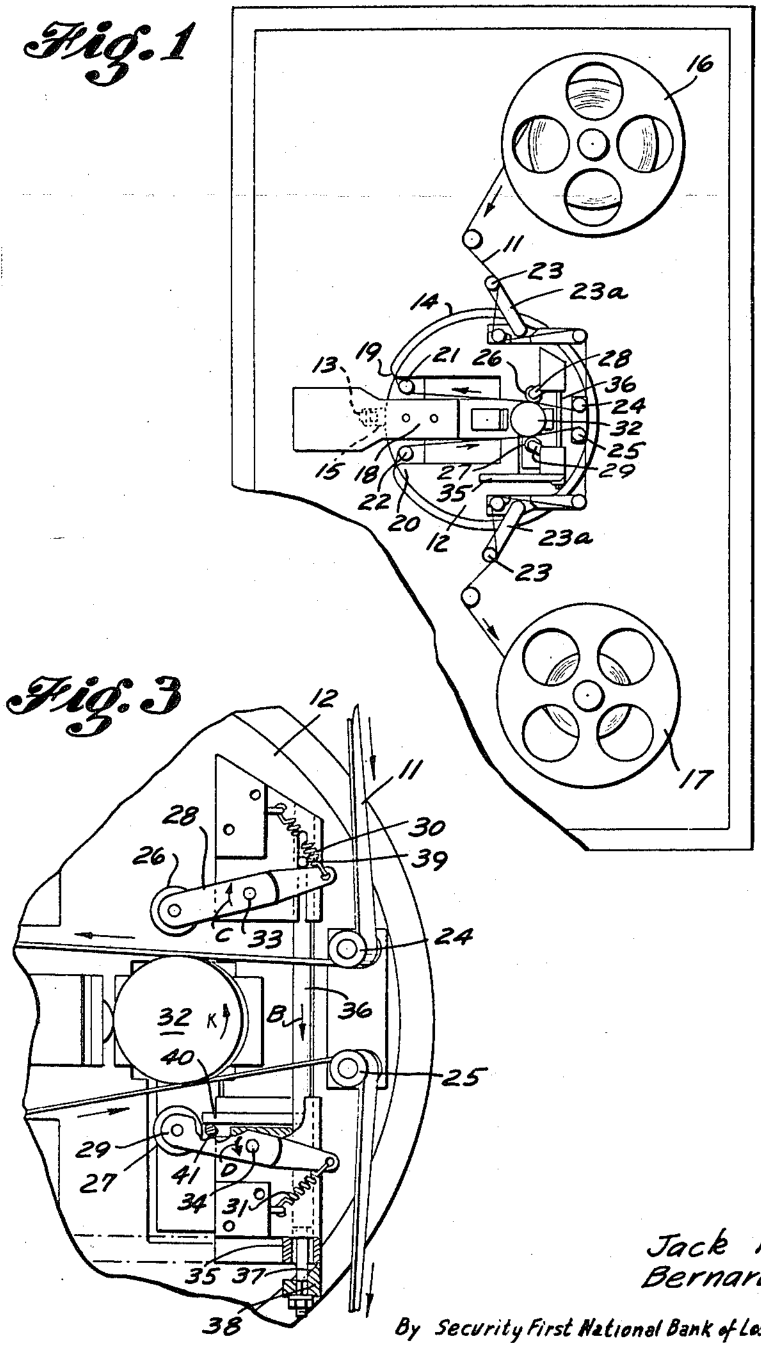
Figure 1 is a plan view of apparatus embodying the invention.
Figure 3 is an enlarged fragmentary view of a tape clamping mechanism of the apparatus of Figure 1 in an "open" position.

The general arrangement of the apparatus according to the invention is illustrated in Figure 1. The apparatus uses magnetic tape 11 supported around a portion of a drum or support disk 12. Magnetic transducing means 13 is fixed to an arm 15 mounted for rotation about the cylindrical outside surface 14 of the disk 12 so that as the arm rotates the transducing means scans the tape. The tape 11 is threaded from a tape supply reel 16, around and along the outside or tape support surface 14 of the disk 12, and then to a take-up reel 17. As will be explained, the movement of the tape 11 along the surface 14 is effected in such a manner as to avoid interference with the rotation of the arm 15 around the surface.

The apparatus of the invention is described in greater detail in connection with Figure 2. The support disk 12, fixed to a frame 18, (shown in Fig. 1), has a cylindrical tape support surface 14 that extends through about 300 degrees of a circle. The support disk 12 is provided with entrance and exit portions, 19 and 20 respectively, through which the magnetic tape 11 is fed onto and off of the support surface 14. A first set of tape guiding pulleys 21 and 22, positioned adjacent to the entrance and exit portions 19 and 20, are each canted to one side so that magnetic tape 11 may be fed by the pulleys onto and off of the disk surface 14 from a position to one side of the plane of the disk. A second set of tape guiding pulleys 24 and 25 are positioned on the side of the disk 12 remote from the first set of pulleys 21 and 22 to better enable the passage of the tape to the disk surface from the aforementioned position on one side of the plane of the disk. The second set of pulleys 24 and 25 are each canted in the same direction as that of the first pulleys 21 and 22 to guide the tape back into a plane parallel to, but spaced from, the plane of the disk 12. The cant of each of the second pulleys is illustrated in Figure 3. The second set of pulleys 24 and 25 guide the tape 11 to and from, respectively, the tape pick-up and feed reels located on the one side of the plane of the disk.

Motors (not shown) connected to the supply and take-up reels 16 and 17, respectively, provide continuous tension on the tape through the apparatus. Tension pulleys 23 (Fig. 1) mounted on spring biased arms **23*a*** maintain tension on the tape during the starting and stopping of the apparatus. In the interest of greater clarity these arms and pulleys have been omitted in Figure 2.

Figure 2:
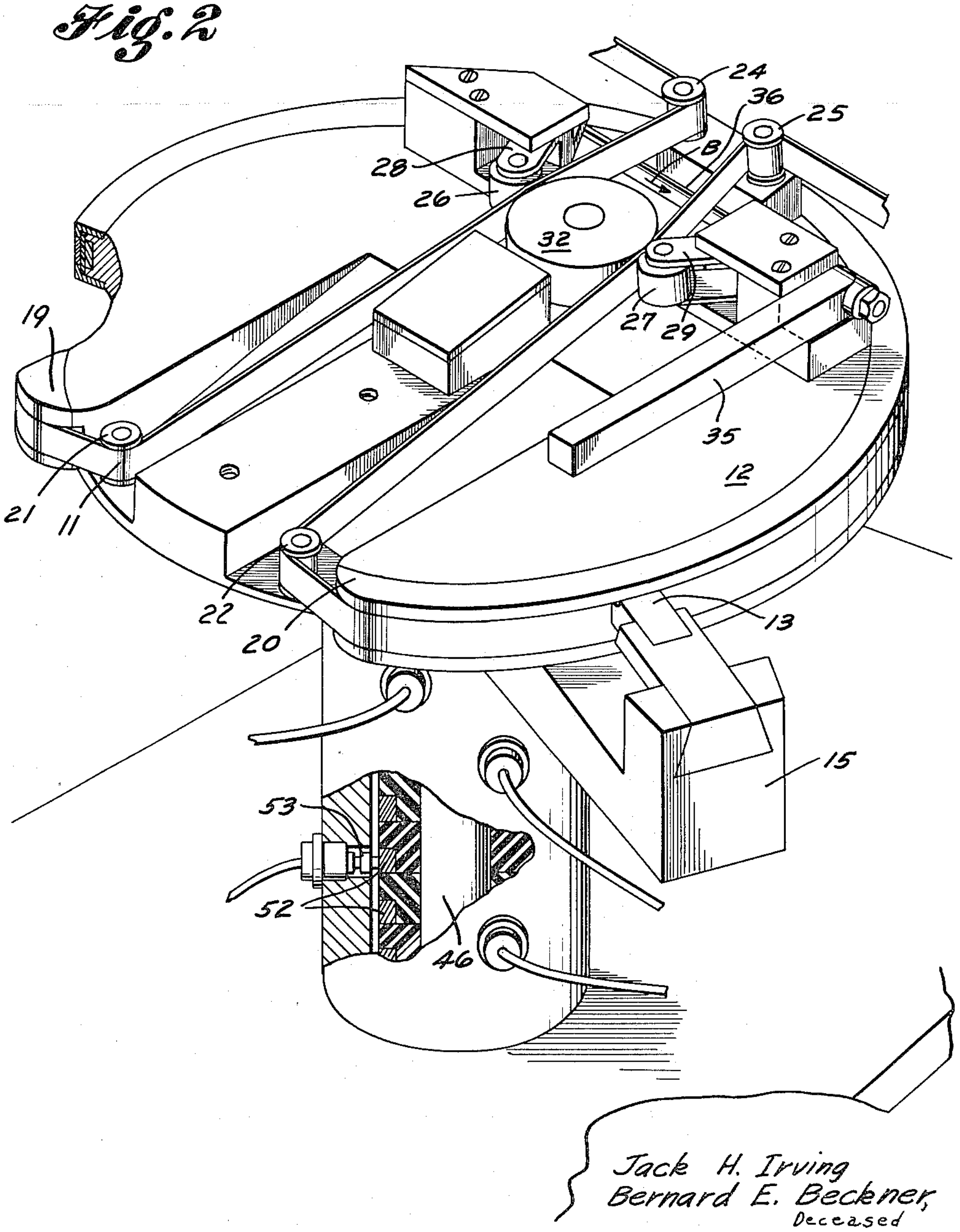
Figure 2 is an enlarged perspective view of a part of the apparatus of Figure 1.

Figures 2 and 3 illustrate the means provided for driving the tape 11 around the surface 14 of the disk 12. Figure 2 shows the means in driving position while Figure 3 shows the means in a position being used during threading of the tape through the apparatus. The tape driving means takes the form of a pair of clamping rollers 26 and 27 mounted on supports 28 and 29, respectively, and spring biased by springs 30 and 31 for pressure contact against a capstan 32. The supports 28 and 29 are mounted on pivots 33 and 34, respectively, fixed to the disk 12. The capstan 32 is connected to a motor (not shown) for rotation in direction K for moving the tape through the apparatus. If the capstan driving motor referred to is of a reversible type, the tape may be driven in either of two directions through the apparatus.

Means are also provided for moving the clamping rollers 26 and 27 away from the capstan 32, from the "closed" position illustrated in Figure 2 to the "open" one illustrated in Figure 3, during a threading of the magnetic tape 11 around the disk support surface 14, and for moving the rollers back into spring biased contact against the capstan during operation of the apparatus. A control arm 35 (Fig. 3) is fixed to a control shaft 36 terminating at one end 37 in a cam follower surface at an oblique angle to the axis of the shaft. The cam follower 38 (Fig. 3) of the control shaft 36 is arranged to lie in the position illustrated in Figure 2 during operation of the apparatus, when tension is required between the clamping rollers 26 and 27 and the capstan 32, and moves in direction B to the position illustrated in Figure 3 when the control arm 35 is raised in a direction away from the plane of the support disk 12 (in a direction up, out of the plane of the drawing). When the control shaft 36 moves in direction B it moves a pin 39 fixed to the shaft in the same direction and against the support 28 of one clamping roller 26. This urges the roller 26 in a direction C away from the capstan 32. The movement of the shaft 36 in direction B also effects a movement of an arm 40, fixed to the shaft, in direction B. The movement of the arm 40 in direction B moves a pin 41 fixed to the other support 29 thus moving the other clamping roller 27 in a direction D away from the capstan 32. The springs 30 and 31 aforementioned return the clamping rollers 26 and 27 to their positions against the capstan 32 when the control arm 35 is returned to the position shown in Figure 2.

As illustrated in Figure 2, the transducing means of the apparatus of the invention includes a transducing head support arm 15 on which is mounted a transducing head such as a playback head 13. The arm 15 is fixed to a spindle 46 for rotation therewith in an arcuate path adjacent to the disk surface 14. The arm rotates in planes containing the support disk 12 and contacts the tape 11 supported on the disk surface. The spindle 46 is connected to be rotated by a constant speed motor (not shown) for effecting rotation of the head 13 around the disk surface 14.

The spindle 46 is provided with a number of electrical slip rings 52 each positioned to be engaged by a pick-up brush 53. The output of the head 13 is connected to a preamplifier (not shown) housed within the arm 15, and the output of the preamplifier is connected to the slip rings 52 for connection by means of the brushes 53 to appropriate utilization devices.

Figure 4:
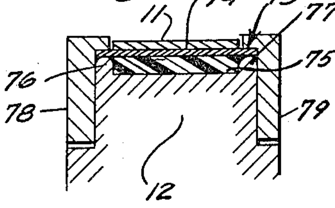
Figures 4 and 5 are fragmentary sectional views illustrating an aspect of a tape support member in the apparatus of Figure 2.
Figure 5:
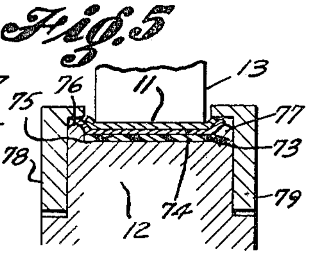

The tape receiving and support surface 14 of the support disk 12 is illustrated in detail in Figures 4 and 5. Figure 4 illustrates a portion of the support disk surface 14 during a time between scansions of the surface portion, and Figure 5 illustrates the same surface during scansion thereof. The disk 12 is made of a member 73 having a high resiliency, and with the surface of the member such that a low friction coefficient exists between the member and the tape supported thereon. This resilient member 73 may take the form of a fiber glass cloth element 74, coated with a material known as Teflon, supported on a polyurethane foam element 75, and fixed in the desired position at the periphery of the disk 12 by means of a pair of lips 76 and 77 extending radially outwardly from the disk. The support disk 12 is also provided with a pair of tape guide elements 78 and 79, one element adjacent to each edge of the resilient member 73, which serve to maintain magnetic tape 11 in a desired path during its travel along the disk surface 14.

The need for the resilient tape supporting surface aforementioned becomes apparent from an appreciation of the fact that the thickness of the magnetic tape varies to a small degree along its length. Therefore, it is not possible to scan the tape on a rigid surface using a rigidly mounted transducing head to contact with the tape. If the head were spring mounted with sufficient spring tension to overcome inertial forces at high scan speeds, and the tape support surface were rigid, the oxide coating of the tape would be worn off. Therefore, the tape supporting surface of the support disk is made resilient and the transducing head is adjusted so that it pushes the tape a small distance below the undisturbed position of the disk surface. The depth of penetration of the heads into the support surface has been exaggerated in Figure 5 for illustrative purposes. It has been found that with this arrangement the tape can be scanned thousands of times without appreciable wear.

Figures 6, 7:
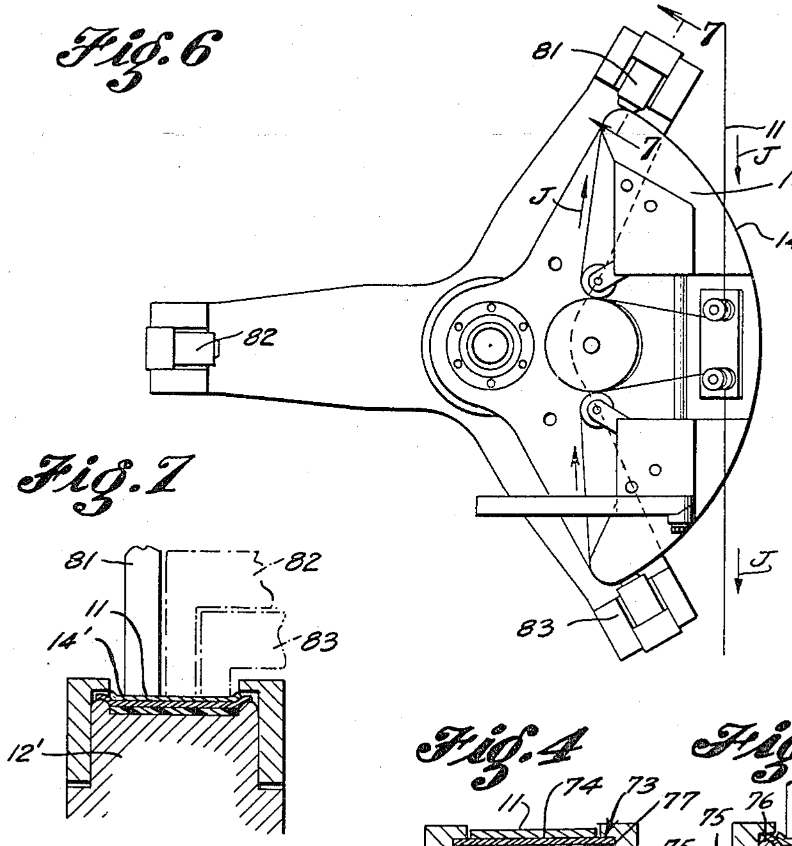
Figure 6 is a diagrammatic plan view of apparatus according to another embodiment of the invention and illustrates a method of continuously presenting a high frequency signal at low magnetic tape speeds.
Figure 7 is a fragmentary sectional view taken through line 7—7 of Figure 6.

Figures 6 and 7 illustrate apparatus according to another embodiment of the invention and in which high frequency signals may be continuously recorded on slowly moving tape 11. In the embodiment here exemplified the relative velocity between each of three transducing heads 81, 82, and 83, and the tape is three times that between the tape and its support surface 14'. In this apparatus the tape support or disk 12' has a tape support surface 14' that extends for 120 degrees of a circle. The three transducing heads 81, 82, and 83 are fixed equally spaced about their center of rotation and are mounted for successive scansion of the tape support surface 14'. Each of the transducing heads 81, 82, and 83 is laterally displaced from the others so that the heads scan separate tracks. The apparatus is otherwise substantially the same as that described above in connection with Figure 1.

Figure 8:
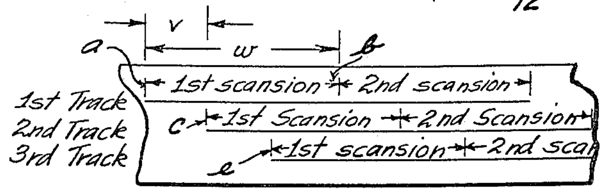
Figure 8 is a schematic representation of the signals recorded on a section of tape by the apparatus of Figure 6.

The tape is moved in direction J along the surface of the support disk 12' at one velocity, say 15 inches per second, and the trio of heads 81, 82, and 83 is rotated around the disk for scansion of the tape at a velocity twice as great as that of the tape but in a direction opposite that of the tape; the relative velocity between the tape and each head is then 45 inches per second. Thus, during the time that the tape moves one given distance $v$, a first transducing head moves a different distance $w$ relative to the tape and records information on the portion of the tape indicated in Figure 8 by the legend "1st scansion." (The 120° arcuate length of the tape support surface is $2v$.) When the first head reaches the end of its scansion (point $b$) the second head has reached scansion position. By this time the tape has moved distance $v$, so that the first scansion of the second head begins at a point $c$ spaced along the length of the tape from the beginning point $a$ of the first scansion of the first head. Similarly, the first scansion of the third head begins at a point $e$ spaced along the tape from the beginning of the previous scansion. Since the tape has by this time moved a distance equal to the length of one scansion, the second scansion of the first head begins at the end (point $b$) of the first scansion of the head.

Thus, the apparatus according to this embodiment is adapted to scan magnetic tape at an effective velocity three times higher than that of the tape relative to its support, and without the use of switching circuits. While the invention has been described with respect to a three head arrangement, it will be appreciated that a greater number of head may be used to achieve higher relative velocities between a transducing head and magnetic tape at a low relative velocity between the tape and its support.

The transducing apparatus of Figure 6 may also be used to handle relatively low frequencies (e.g., .01 cycle per second). It has been found that the usual difficulty in handling low frequency signals lies, not in recording the signals on magnetic tape, but rather in playing back the recorded signals. The difficulty in playback arises due to the low rate of cutting of magnetic flux by the playback head, the strength of the output signal from a playback head increasing for increasing flux cutting rates. Thus, the tape may be moved very slowly during recording to record low frequency signals and then played back with a high relative velocity between the tape and the playback head. For example, consider a recording speed of .01 inch per second. A frequency of .02 cycle per second will then have a wave length of .5 inch on the tape. If on playback the relative velocity between the playback head and the tape is made of the order of 3000 inches per second, a relatively strong output signal will be provided.

From the foregoing it is seen that the invention provides an improved method and apparatus which lends itself to the presentation of high frequency signals at low magnetic tape speeds. While some fields of employment have been described, it will be appreciated that the method and apparatus may be used to advantage in other signal storage and/or playback environments.

What we claim as new and desire to secure by Letters Patent of the United States is:

1. A magnetic transducing system comprising: a non-rotatable support means having an arcuate path therearound encompassing at least about 200° of a circle in a plane perpendicular to the axis of the arcuate path, said means being arranged for supporting a portion of a length of elongated tape with the portion supported having its center line in a plane perpendicular to said axis and being relatively movable along said arcuate path at one relative speed; and a transducing head spaced from said axis and movable in a circular path adjacent to said arcuate path, said head being drivable at a speed substantially greater than that of said tape whereby said head will scan repeatedly at least a portion of said tape during the passage of the tape over said arcuate path, said arcuate path including a resilient element outwardly supporting said tape whereby scansion by said head of a portion of said tape is feasible with the contact scansion resulting in a slight depression of said resilient element.

2. A magnetic transducing system comprising: an elongated magnetic recording medium; a non-rotatable support means having a planar arcuate path therearound with the outer surface of said path being provided with a coating having a low coefficient of friction relative to said magnetic recording medium and being arranged for supporting a portion of a length of said recording medium having its center line in the same plane as said arcuate path; said recording medium being relative movable along said arcuate path at one relative speed, said one relative speed being below that which will cause excessive heating of said recording medium due to the friction between said recording medium and said outer surface; a transducing head movable in a circular path adjacent to said arcuate path, said head being drivable at a speed substantially greater than said recording medium whereby said head will make repeated constant scansions of successive portions thereof, the contact area of said head being substantially less than the length of said arcuate path whereby the occurrence of friction heat between said head and said recording medium will not cause excessive heating thereof at substantially higher speeds than the said one relative speed.

References Cited in the file of this patent

UNITED STATES PATENTS

| | | |
|---|---|---|
| 2,661,397 | Berens et al. | Dec. 1, 1953 |
| 2,722,676 | Begun | Nov. 1, 1955 |
| 2,737,646 | Muffly | Mar. 6, 1956 |
| 2,773,120 | Masterson | Dec. 4, 1956 |
| 2,816,157 | Andreas et al. | Dec. 10, 1957 |

FOREIGN PATENTS

| | | |
|---|---|---|
| 657,494 | Great Britain | Sept. 19, 1951 |
| 1,059,964 | France | Nov. 18, 1953 |